(12) United States Patent
Hammes

(10) Patent No.: US 7,691,165 B1
(45) Date of Patent: Apr. 6, 2010

(54) FLUID FILTER FRAME SYSTEM AND METHOD

(76) Inventor: Frank Hammes, Seestrasse 44, CH-9326 Horn (CH)

( * ) Notice: Subject to any disclaimer, the term of this patent is extended or adjusted under 35 U.S.C. 154(b) by 750 days.

(21) Appl. No.: 11/451,955

(22) Filed: Jun. 12, 2006

(51) Int. Cl.
*B01D 46/00* (2006.01)
(52) U.S. Cl. .............................. 55/495; 55/497; 55/502; 55/DIG. 5; 55/DIG. 31; 210/435
(58) Field of Classification Search ............... 55/502, 55/490, 497, 498, 504, 521, 499, 503, DIG. 33, 55/DIG. 31, DIG. 35, DIG. 5, 495; 210/435
See application file for complete search history.

(56) References Cited

U.S. PATENT DOCUMENTS

| | | | | |
|---|---|---|---|---|
| 5,603,476 | A * | 2/1997 | Merk et al. ............... | 248/309.1 |
| 5,902,361 | A * | 5/1999 | Pomplun et al. ........... | 55/385.3 |
| 6,159,260 | A * | 12/2000 | Hammes ..................... | 55/502 |
| 6,267,796 | B1 * | 7/2001 | Schottmer ................... | 55/502 |
| 6,406,509 | B1 | 6/2002 | Duffy | |
| 6,568,540 | B1 * | 5/2003 | Holzmann et al. .......... | 210/445 |
| 7,261,757 | B2 * | 8/2007 | Duffy ......................... | 55/502 |
| 7,300,486 | B1 * | 11/2007 | Kirsch ......................... | 55/502 |
| 7,341,613 | B2 * | 3/2008 | Kirsch ......................... | 55/495 |
| 2003/0070405 | A1 * | 4/2003 | Michaelis et al. ............. | 55/497 |
| 2003/0070406 | A1 * | 4/2003 | Duffy ......................... | 55/497 |

\* cited by examiner

*Primary Examiner*—Duane Smith
*Assistant Examiner*—Minh-Chau T Pham
(74) *Attorney, Agent, or Firm*—Dennis W. Beech

(57) ABSTRACT

The present invention may be used for framing a fluid flow filter pack. A first frame member may have a first border element with an open portion. The first border element may have four first side walls bendable along a line parallel to a peripheral edge of each of the first side walls. A second frame member may have a second border element with an open portion. The second border element may have four side walls bendable along a bend line parallel to an outer edge of each side wall. Each side wall of the second frame member may have a sealing flap bendable along the outer edge. The second frame member may be positioned on the first frame member with each side wall overlapping and attached to one of the first frame member side walls. The sealing flap may be bent to be adjacent to the second frame member side walls.

17 Claims, 5 Drawing Sheets

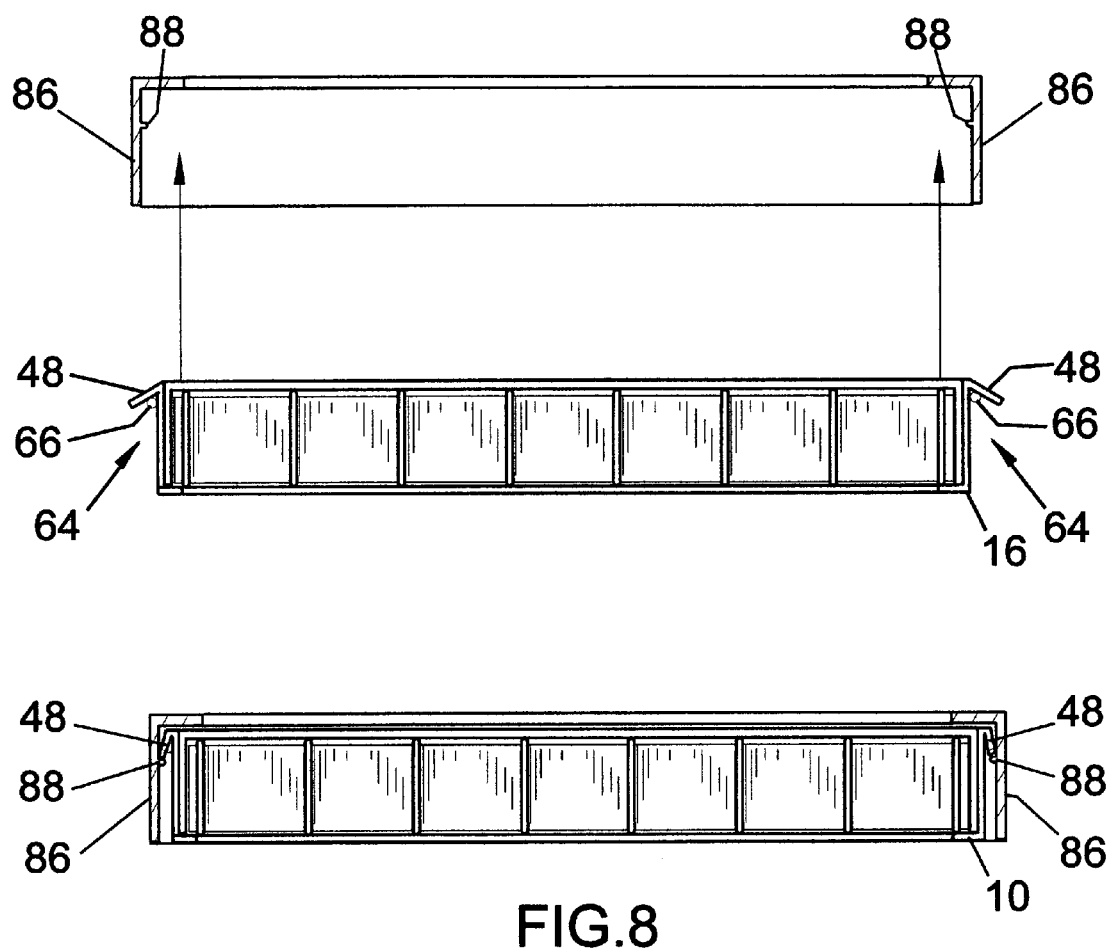

FLUID FILTER FRAME SYSTEM AND METHOD

BACKGROUND OF THE INVENTION

This invention relates to fluid filter devices, systems and methods for framing a filter element, for example, a pleated filter pack, for airflow filtering applications. The new fluid filter frame system and method may allow ease of assembly, may include filter pack structural strength and may have a sealing flap.

Various fluid filter devices and methods of assembly may currently be used. The filters may have a filter media or filter pack that may be framed in a strip frame that may be attached by an adhesive-potting compound. Other framing structures may include corrugated box halves that may be attached to a filter pack. Sheet elements may be used to frame a filter pack wherein the sheet elements may have complicated structure elements that may have a snap fit or attachment.

SUMMARY OF THE INVENTION

The present invention is directed to devices and methods for framing a filter pack for use in a fluid flow channel. A first frame member may have a first border element that may have a first open portion. The first border element may have four first side walls bendable along a line parallel to a peripheral edge of each of the first side walls. An attachment tab may be attached at an end of each of the first side walls. A second frame member may have a second border element that may have a second open center portion. The second border element may have four second side walls bendable along a bend line parallel to an outer edge of each second side wall. Each second side wall may have a sealing flap bendable along the outer edge. The second frame member may be positioned on the first frame member with each second side wall overlapping and attached to one of the first side walls. The sealing flap may be bent to be adjacent to the second side walls.

These and other features, aspects and advantages of the present invention will become better understood with reference to the following drawings, description and claims.

BRIEF DESCRIPTION OF THE DRAWINGS

FIG. 8 illustrates a side cross-sectional view of a fluid filter insertion method in an air opening frame of a fluid flow channel according to an embodiment of the invention.

DETAILED DESCRIPTION

Figure 2:
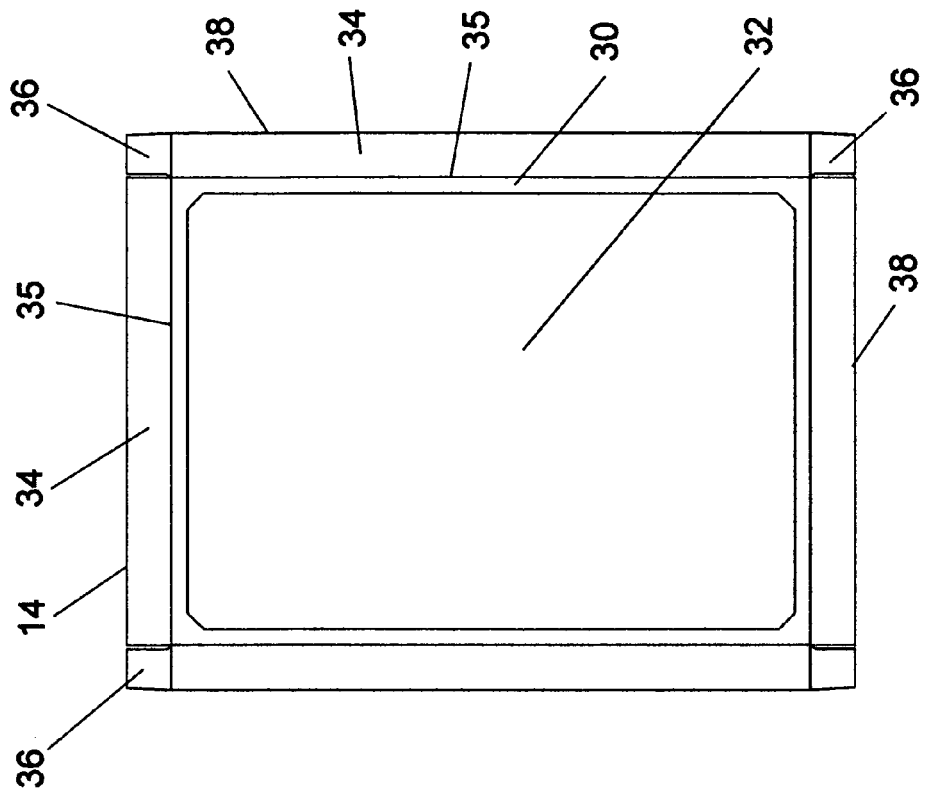
FIG. 2 illustrates a plan view of a first frame member according to an embodiment of the invention.
Figure 1:
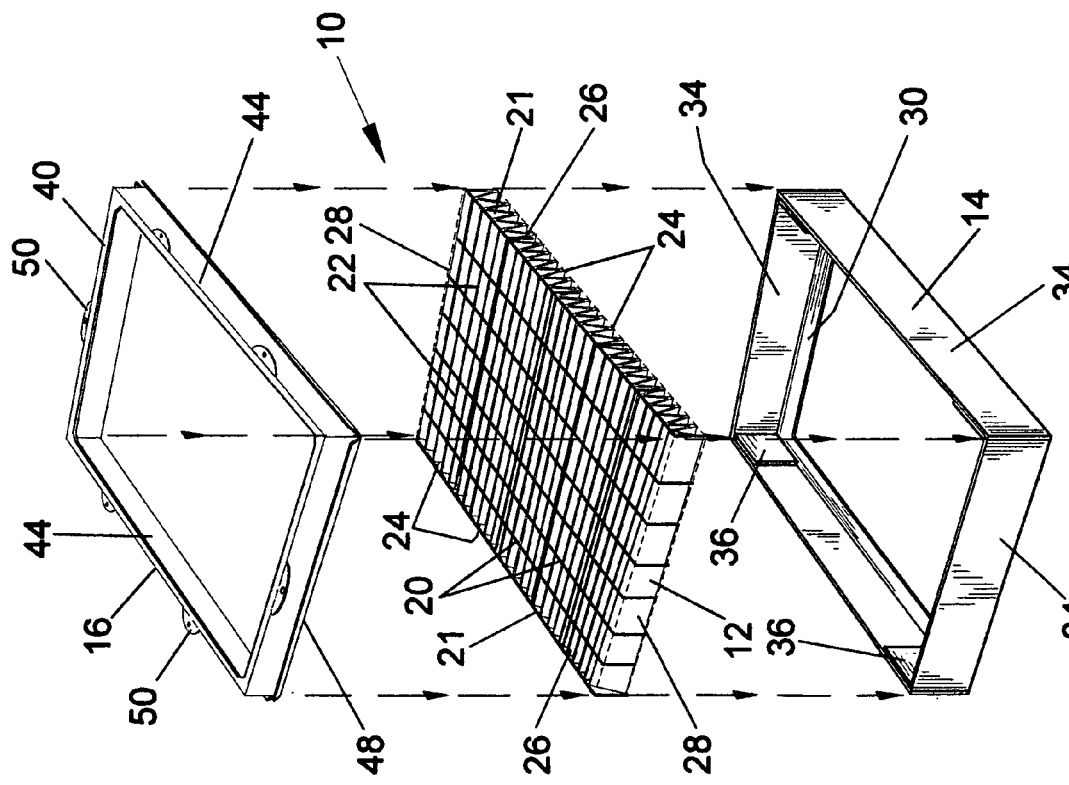
FIG. 1 illustrates a perspective exploded view of the device according to an embodiment of the invention.
Figure 4:
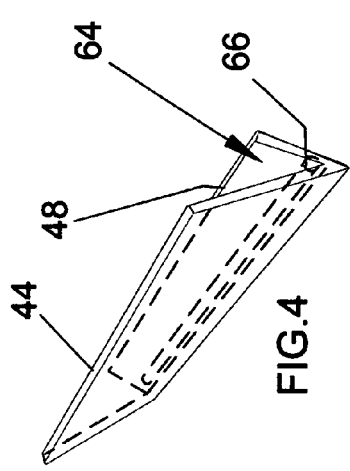
FIG. 4 illustrates a perspective view of a side wall and sealing flap according to an embodiment of the invention.
Figure 5:
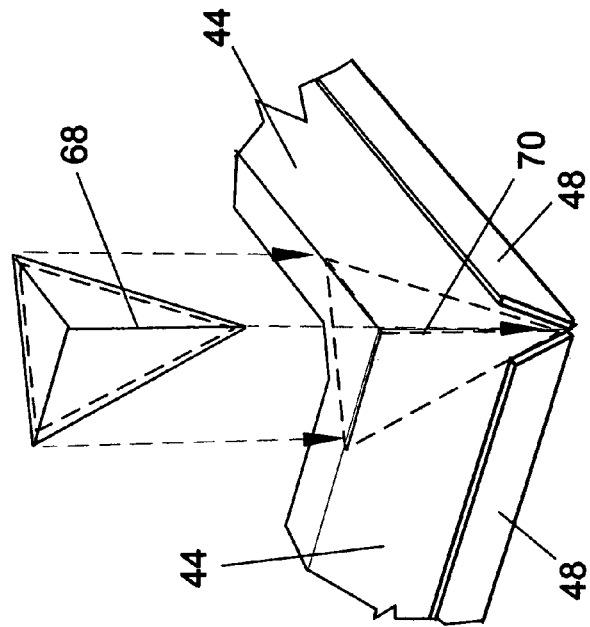
FIG. 5 illustrates a perspective view of a corner according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 5, a fluid filter device 10 may have a pleated filter pack 12 framed by a first frame member 14 and a second frame member 16. The pleated filter pack 12 may be an accordion or corrugated folded or pleated form as may be known in the art as a filter pack. It may have spacer ribs 20 formed from hot melt bead lines, glue strings, plastic or the like spaced apart to maintain a desired separation distance between adjacent pleat elements 22. The pleat ends 24 may form two sides of the pleated filter pack 12 and the pleat ends 24 may be filled and sealed adjacent the side faces 26 to inhibit airflow out of the pleat ends 24.

The first frame member 14 may be stamped, punched, cut or otherwise formed from a suitable sheet material such as paperboard, cardboard, plastic or other material that may be scored, cut, marked or grooved to allow bending. The first frame member 14 may be approximately rectangular in form having a primarily open center portion 32 with a border element 30 and may have four side walls 34 attached to the border element 30. Four attachment tabs 36 may be attached at four ends of the side walls 34. The side walls 34 may be defined and made bendable relative to the border element 30 by scoring, cutting, slitting or a combination thereof, marking by a groove or like method the first frame member 14 material on a line 35 parallel to the peripheral edge 38 of each side wall 34.

The side walls 34 may be bent to an approximately orthogonal position relative to the border element 30. The attachment tabs 36 may be bent relative to one side wall 34 to overlap an adjacent side wall 34 to be attached by glue, epoxy, hot melt glue, glue beads or the like adhesive.

The filter pack 12 may be inserted in the first frame member 14 to be positioned adjacent the border element 30 and side walls 34. An adhesive may be applied between the filter pack 12 and the border element 30 and the side walls 34. The adhesive may be glue, glue beads, hot melt glue, epoxy or the like. The adhesive may be applied in sufficient quantity to seal the pleat ends 24 and filter ends 28 to inhibit flow of fluid or air between the side walls 34 and the filter pack 12.

The second frame member 16 may be approximately rectangular in form having a primarily open center portion 42 with a border element 40 and may have four side walls 44. There may be a sealing flap 48 attached at an outer edge 46 of the side walls 44. There may be tabs 50 having an aperture 52 formed in the side walls 44. The side walls 44 and sealing flaps 48 may be defined and made bendable relative to the border element 30 and to each other by scoring, cutting, a combination thereof, marking by a groove or like method. The bend lines 54 may be formed on lines parallel to the outer edge 46 of each side wall 44. The tabs 50 may be cut or stamped relative to the side walls 44 to form an arched outer edge 56 and may be scored, marked or the like as part of the bend lines 54 between the border element 40 and the side walls 44. The arched outer edge 56 may allow the tab 50 to be urged by a filter mount or structure slot to align with the side walls 44 in those instances where the fluid filter 10 may be slidably inserted on side walls 44 into a filter structure. In the instance of a the fluid filter being inserted perpendicular to an air inlet, see FIG. 8, the tabs 50 may be positioned for ease of deployment on bend lines 54 to allow use of the tabs 50 to remove the fluid filter 10.

Figure 3:
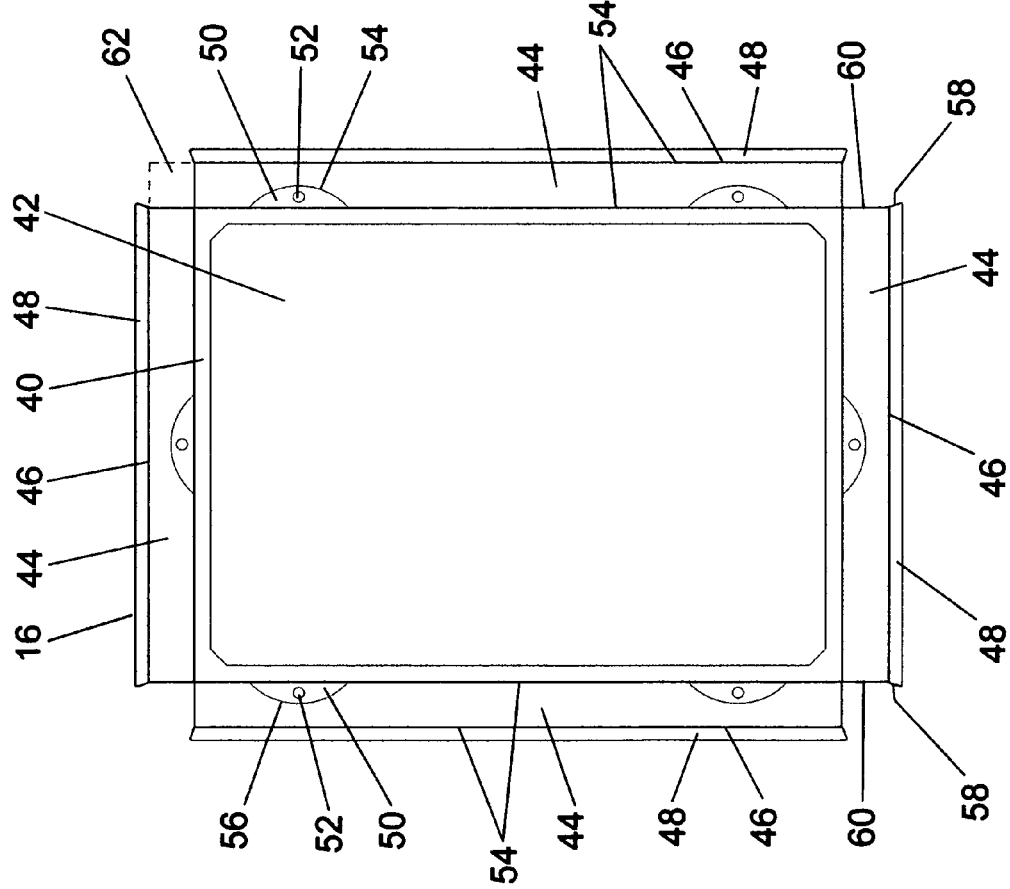
FIG. 3 illustrates a plan view of a second frame member according to an embodiment of the invention.

The ends 58 of the sealing flaps 48 may be parallel to the ends 60 of the side walls 44, or the ends 58 may be slanted outwardly at an engle relative to the side walls 44 as best viewed in FIG. 3. The second frame member 16 may have attachment tabs 62 for attachment of adjacent side wall 44 similar to the first frame member 14 attachment tabs 36.

The second frame member 16 may be positioned on the filter pack 12 with the open center portion 42 opposed and spaced apart from the first frame member 14 open center portion 32 with the filter pack 12 therebetween. The side walls 44 may be folded over the first frame member 14 side walls 34 and attached thereto by adhesives, such as, glue, epoxy, glue beads or the like. The adhesive may be applied in sufficient quantity to seal the side walls 34, 44 to inhibit flow of fluid, such as, air, between the side walls 34, 44. The second frame member 16 side walls 44 may be approximately the same width as the first frame member 14 side walls 34 or the side walls 44 may be narrower than side walls 34. This may position the sealing flaps 48 intermediate the line 35 or edge of the border element 30 and the bend line 54 of the border element 40.

The sealing flaps 48 may be bent to be adjacent the side walls 44. This may position the sealing flaps 48 to press against an airflow channel, airflow inlet port or the like to inhibit fluid flow around the side walls 44 when the fluid filter 10 may be inserted to filter fluid. If the sealing flap ends 58 may be slanted, adjacent sealing flap ends 58 may abut to further inhibit fluid flow. The space 64 between the side walls 44 and sealing flaps 48 at an angle adjacent the outer edge 46 may have a resilient material 66, such as a bead line of glue, silicone or the like disposed therein to position the sealing flaps 48 at an angle away from the side walls 44. Alternatively, an extruded cord of rubber or other resilient material 66 may be attached in the space 64. Another alternate method to positioning material in space 64 may be to bend the sealing flaps 48 to the desired angle adjacent the side walls 44 and then to impregnate the outer edge 46 and adjacent structural material with a stiffening fluid, such as an adhesive or epoxy having a density to allow absorption of the fluid.

Figure 6:
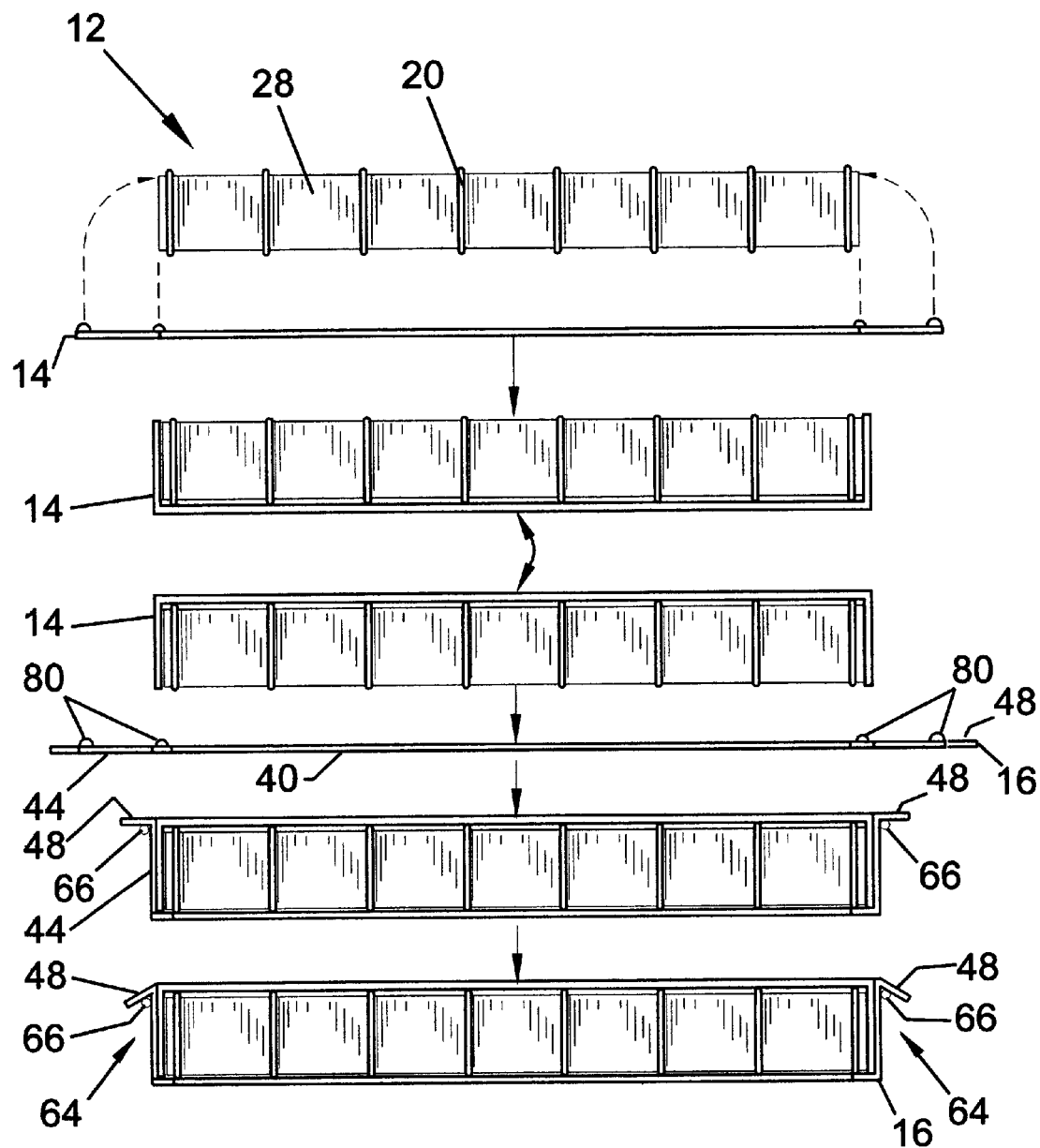
FIG. 6 illustrates a side cross-sectional view of a fluid filter assembly process according to an embodiment of the invention.

Referring to FIG. 6, a fluid filter 10 assembly process as disclosed may include the steps of placing a filter pack 12 on a first frame member 14 having a bead line 80 of adhesive for attachment adjacent pleat ends 24 and filter ends 28. The side walls 34 having a bead line 80 of adhesive may then be folded upward against the side faces 26 and filter ends 28. The first frame member 14 with filter pack 12 may then be placed on a second frame member 16 having a bead line 80 of adhesive for attachment adjacent pleat ends 24 and filter ends 28. The side walls 44 having bead lines 80 of adhesive may then be folded against side walls 34. The sealing flaps 48 may then be folded on bend lines 54 to be adjacent to side walls 44 and a resilient material 66 may be disposed and attached in space 64.

Figure 7:
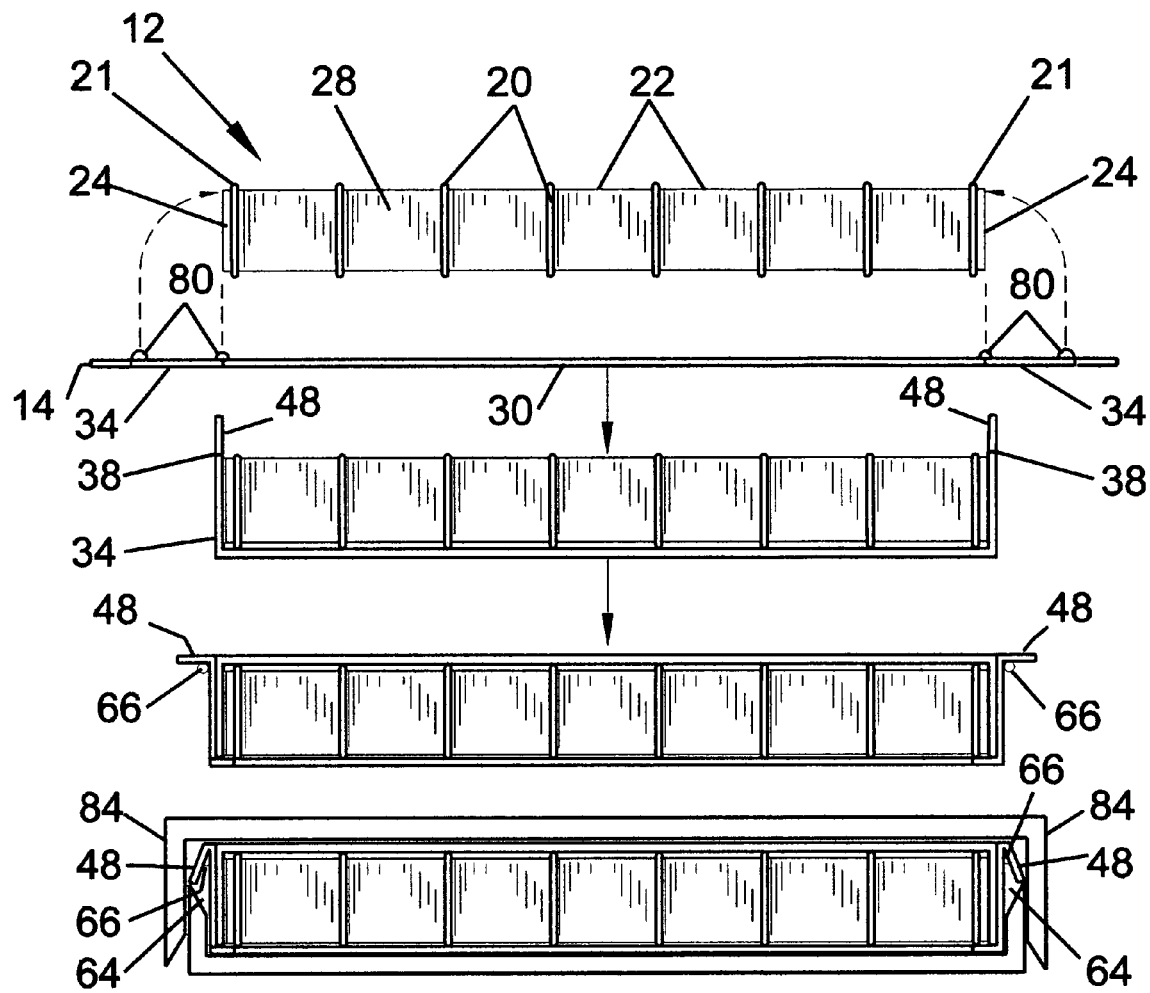
FIG. 7 illustrates a side cross-sectional view of a first frame member assembly process according to an embodiment of the invention.

Referring to FIG. 7, an alternate fluid filter 10 may have only a first frame member 14. In this embodiment the first frame member 14 may have sealing flaps 48 attached at peripheral edges 38. The first frame member 14 may be attached to the filter pack 12 as described above. The sealing flaps 48 may then be folded on peripheral edges 38 to be adjacent to side walls 34 and a resilient material 66 may be disposed and attached in space 64. An assembly structure with a border element 30 and side wall 34 assembly form 82 and a sealing flap 48 bend form 84 may be used to assemble the fluid filter 10. The bend form 84 may retain the sealing flaps 48 in proper position during the curing process of the resilient material 66.

Referring to FIG. 8, for a particular installation an airflow channel, airflow inlet 86 or other installation location may incorporate protrusions 88 in the walls where the fluid filtration device 10 may be installed. The protrusions 88 may serve to catch the sealing flaps 48 to aid in retaining the fluid filter device 10 in the installation location.

A corner element 68 that may be formed of a resilient material may be inserted at each corner 70 of the second frame member to engage adjacent sealing flap ends 58 to inhibit flow of fluids at corner 70. The corner elements 68 may be attached by glue, epoxy or the like.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device attachable to a filter pack for disposing in a fluid flow channel comprising:
   a first frame member having a first border element having a first open center portion therein, wherein said first border element having four first side walls bendable along a line parallel to a peripheral edge of each of said first side walls;
   an attachment tab attached at an end of each of said first side walls;
   a second frame member having a second border element having a second open center portion therein, wherein said second border element having four second side walls bendable along a bend line parallel to an outer edge of each second side wall;
   each of said second side walls having a sealing flap bendable along said outer edge; and
   said second frame member disposable on said first frame member with each of said second side walls overlapping and attached to one of each of said first side walls and said sealing flaps bent to be adjacent to said second side walls.

2. The device as in claim 1 wherein a tab is formed in each of said second side walls and said tab attached and bendable at said bend line.

3. The device as in claim 2 wherein said tab having an aperture therein.

4. The device as in claim 2 wherein said tab having an arched outer edge.

5. The device as in claim 1 wherein said sealing flaps having flap ends that extend outwardly at an angle relative to an end of each of said second side walls.

6. The device as in claim 1 wherein a resilient bead of material is disposed and attached between each of said second side walls and said sealing flaps adjacent said outer edge.

7. The device as in claim 1 wherein when said sealing flaps are bent, said sealing flaps and said second side walls are impregnated with a stiffening fluid adjacent said outer edge.

8. The device as in claim 1 wherein a corner element is inserted and attached at each of four corners of said second frame member disposed to engage adjacent sealing flap ends.

9. The device as in claim 1 wherein attachment is by an adhesive.

10. The device as in claim 1 wherein said attachment is by an adhesive applied in sufficient quantity to inhibit flow of fluids between said first side walls and said second side walls.

11. The device as in claim 1 wherein said attachment is by an adhesive applied in sufficient quantity to inhibit flow of fluids between said first side walls and said filter pack.

12. The device as in claim 1 wherein said filter pack is a pleated filter pack.

13. The device as in claim 1 wherein said sealing flaps are disposed to engage a protrusion attached to an airflow inlet.

14. A device for filtering fluid flow in a fluid flow channel comprising:
- a filter pack disposed and retained between a first frame member and a second frame member;
- said first frame member having a first border element having a first open center portion therein, wherein said first border element having four first side walls positioned approximately orthogonal to said first border element wherein one of each of said first side walls is attached to one of two side faces and two side ends of said filter pack;
- said second frame member having a second border element having a second open center portion therein, wherein said second border element having four second side walls positioned approximately orthogonal to said second border element wherein one of each of said second side walls overlaps and is attached to one of each of said first side walls; and
- a sealing flap attached at an outer edge of each of said second side walls and said sealing flaps disposed to be adjacent to said second side walls.

15. The device as in claim 14 wherein there is an attachment tab attached between adjacent first side wall ends.

16. A device attachable to a filter pack for disposing in a fluid flow channel comprising;
- a frame member having a border element having an open center portion therein, wherein said border element having four side walls bendable along a line parallel to a peripheral edge of each of said side walls;
- each of said side walls having a sealing flap bendable along said peripheral edge; and
- said sealing flaps bent to be adjacent to said side walls.

17. A method for assembly of a fluid filter device comprising:
- disposing a filter pack on a first frame member having a bead line of adhesive for attachment adjacent a pair of pleated ends and a pair of filter ends of said filter pack;
- folding a plurality of first side walls having a bead line of adhesive for attachment to a pair of side faces and said pair of filter ends to attach said first side walls;
- disposing said first frame member and said filter pack on a second frame member having a bead line of adhesive for attachment adjacent said pair of pleated ends and said pair of filter ends;
- folding a plurality of second side walls having a bead line of adhesive for attachment to said plurality of first side walls;
- folding a plurality of sealing flaps on a plurality of bend lines parallel to an outer edge of said plurality of second side walls to dispose said sealing flaps adjacent said second side walls.

* * * * *